United States Patent [19]
Stauff et al.

[11] 3,798,796
[45] Mar. 26, 1974

[54] METHOD AND EQUIPMENT FOR TRAINING PERSONNEL IN THE OPTICAL TRACKING OF A MOVING TARGET

[75] Inventors: Emile Stauff, Versailles; Hubert Collette, Neuilly-sur-Seine, France

[73] Assignee: Societe Nationale Industrielle Aerospatiale, Paris, France

[22] Filed: July 26, 1972

[21] Appl. No.: 275,307

[52] U.S. Cl.............. 35/25, 273/101.1, 178/DIG. 1
[51] Int. Cl. ............................................. F41g 3/00
[58] Field of Search ...... 35/25, 1; 273/101.1, 105.1; 178/DIG. 38

[56] References Cited
UNITED STATES PATENTS

| | | | |
|---|---|---|---|
| 2,359,032 | 9/1944 | Gott | 178/DIG. 38 |
| 3,417,198 | 12/1968 | Loyd | 178/DIG. 38 |
| 3,562,423 | 2/1971 | Murphy | 178/DIG. 38 |

Primary Examiner—Harland S. Skogquist
Assistant Examiner—J. H. Wolff
Attorney, Agent, or Firm—Karl W. Flocks

[57] ABSTRACT

System for rapidly training operators required to accurately aim an optical instrument at a stationary or moving target.

It consists in equipping the optical aiming instrument handled by the trainee with a television camera to which is associated a reticle the optical axis of which is sighted with that of the optical instrument. A device for displaying the images analysed by the camera and reticle is available to an instructor so that this latter may give useful advice to the trainee during his aiming operations.

5 Claims, 1 Drawing Figure

PATENTED MAR 26 1974  3,798,796
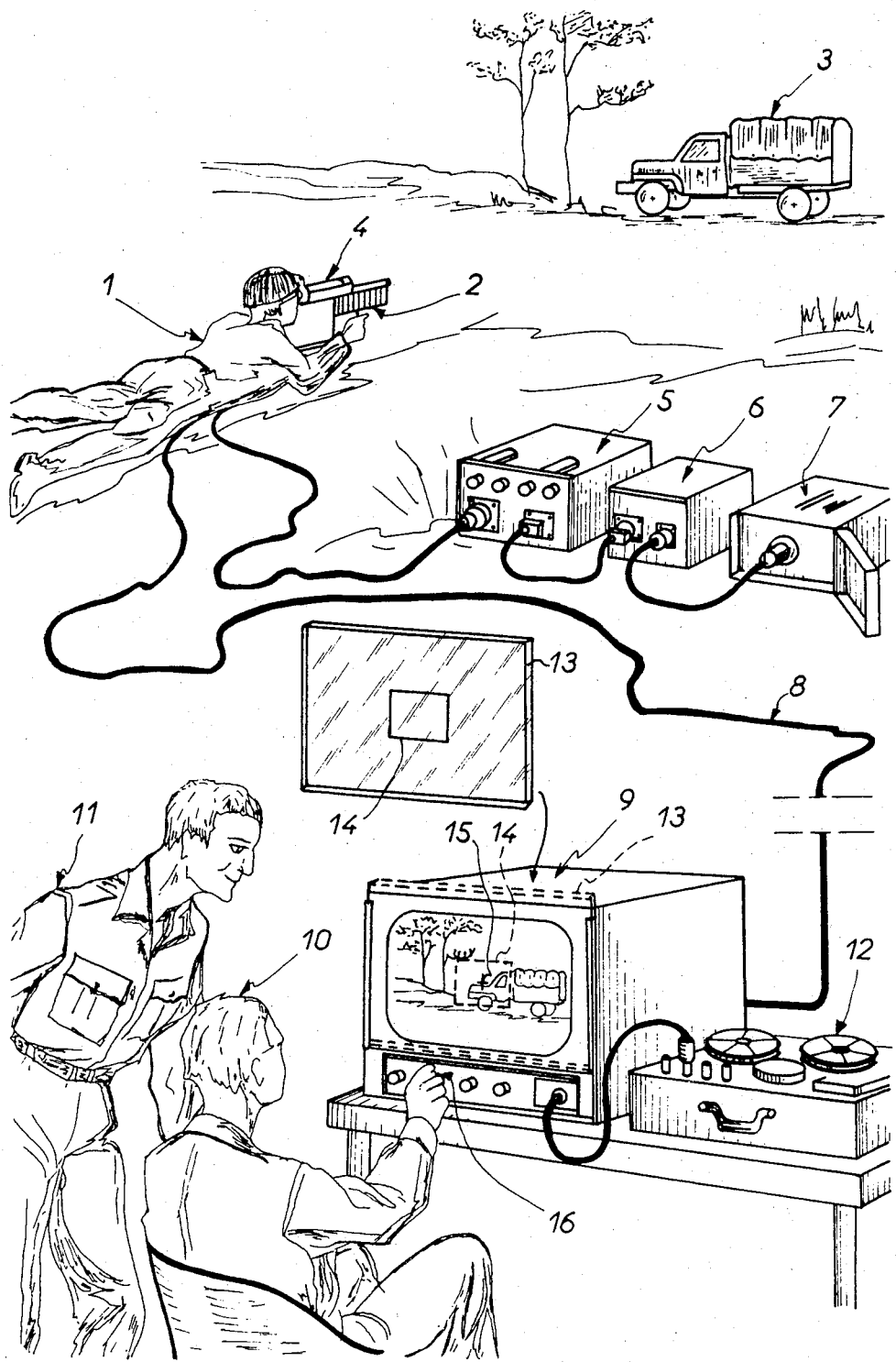

METHOD AND EQUIPMENT FOR TRAINING PERSONNEL IN THE OPTICAL TRACKING OF A MOVING TARGET

The present invention relates to a method for rapidly training operators required to accurately aim an optical instrument at a stationary or moving target, and to the means and/or installation for performing said method.

It is customary at present to provide this training with such varied systems as:
- secondary optical devices enabling the instructors to check the trainee operator's work, though often under uncomfortable conditions;
- devices which are based on the recording or utilization of aiming error voltages but which require special targets and provide only limited elements for assessing the reasons for the aiming errors;
- special-purpose simulators, but which often do not allow the real equipment to be handled under actual operational conditions;
- motion-picture cameras which, although they do in fact record what the trainee saw, do not allow the instructor to advise him during manipulation and in which the delays needed to develop the film and the constraints attached to its projection delay exploitation of the results obtained and diminish the effecacy of the training;
- and, in the realm of sports in particular, for some years now, in order to help train athletes, systems which include a television camera, a display device or scope and a video recorder; it has hitherto not been possible to use such systems for instructions in accurately aiming optical instruments at targets, by reason of possible offsets of the image received on the scope in relation to the axis of the reticle, especially in the case of equipment intended for use in the field.

The subject method and installation of this invention allow of completely overcoming the drawbacks inherent in the equipment at present in use.

Moreover, an advantage of prime importance offered by the present invention is that it provides the following possibilities simultaneously:
- the ability for the trainee to use the actual operational equipment without any modifications to the latter;
- an immediate display, before the instructor and other trainees, at a distance and under comfortable conditions, of what the trainee sees, and notably an exact showing of the offset between the centre of the reticle and the centre of the target;
- immediate re-runs of the display after the test, as many times as required;
- a quantitative analysis of the aiming errors.

The method of training personnel in accurately aiming optical instruments at a stationary and/or moving target according to this invention is characterized in that it consists in:
- equipping the optical aiming instrument handled by the trainee with a television camera to which is associated a reticle the optical axis of which is boresighted identically with that of the optical instrument;
- supplying said camera by means of a sequence of conventional units;
- transmitting the video signal and the image of the camera reticle to a device for displaying the images analysed by the camera, said device enabling one or more instructors and trainees to view from a distance and under good conditions what the aimer saw;
- connecting a video recorder to the display device in order to store the images displayed and reproduce them within time lapses and a rate appropriate to the training;
- choosing, out of a set of transparent grids each of which is marked to represent the dimensions of a given target at a given range, the one most appropriate to the particular target being sighted by the aimer;
- positioning the selected grid before the projection screen of the display device in order to enable the instructor to evaluate the operator's aiming errors, and at the same time causing the grid to coincide with the camera reticle by using the customary knobs for framing the image projected by the display device;
- and providing a voice link between the instructor and the trainee operator so that useful advice can be given to the latter during the aiming operations.

The installation for performing the above-disclosed method is characterized in that it consists in the combination of:
- a television camera fixed to the optical aiming instrument, said camera being provided with a reticle the optical axis of which is boresighted identically with said optical instrument;
- a conventional feed channel for said camera;
- a device for displaying the images analysed by the camera and the camera reticle, available to one or more instructors and trainees;
- a video recorder connected to said display device in order to store the images displayed and restore them after the required time lapse and at the desired rate;
- a set of transparent grids each bearing marks representing the dimensions of a given target at a given range, that grid which corresponds to the target being aimed at by the trainee being positioned before the projection screen of the display device whereby to enable the instructor to evaluate the trainee's aiming errors and make the grid coincide with the camera reticle by means of the conventional knobs for framing the image projected by the display device;
- and a voice link between the instructor and the trainee operator to allow useful advice to be given to the latter during the aiming operations.

Further particularities and advantages of the present invention will emerge from the description which follows with reference to the accompanying non-limitative exemplary schematic drawing of a possible embodiment of a trainee installation according to the invention for providing rapid and precise instruction for so-called 'optical aimer' personnel.

To this end the trainee-operator 1 must be instructed in how to aim the reticle, stylus, or the like, of an optical instrument 2 at a given point on a preferable moving target 3.

In accordance with this invention, a television camera 4 is fixed to the instrument 2, for instance by means of a clamp or strap in order to avoid having to modify the optical instrument.

It is an important teaching of this invention that the camera 4 is provided with a reticle which is used beforehand to ensure that the camera 4 is boresighted with the reticle of optical instrument 2.

The optical reticle on the camera can be produced:

either by actually engraving a reticle on the sensitive part of the camera tube;
or by means of an external optical process for projecting the luminous image of a reticle on to the sensitive part of the camera tube.

Preferably, this reticle includes angular error marks for enabling the aiming errors made by the trainee operator to be measured on the scope, (after application of the scale correction factor), as will be explained hereinafter.

The camera 4, which scans all or part of the field of view of the trainee 1, allows the latter to manipulate the optical instrument either under actual operating conditions, or indoors, against a target represented by a film projected on a screen.

Positioned at some distance from the optical instrument/camera unit are a unit for generating signals 5 from the camera 4, a power supply unit 6 and a battery unit 7.

It is to be noted that the above units may be of any convenient type whatsoever and will not therefore be described in greater detail herein in the interests of clarity of the description.

A coaxial cable 8, or possibly a radio link well known per se, transmits the video signal to a cathode-ray tube type monitor 9 which displays the images scanned by television camera 4. This display monitor allows one or more instructors or trainees 10, 11 to view from a distance, under good conditions, what trainee operator 1 sees.

A voice link of any convenient type is provided between instructor and trainee so that the latter can be given useful advice during the aiming operations.

A video recorder 12 of any suitable type is connected to display monitor 9 for the purpose of storing the pictures transmitted and redisplaying them on monitor 9 as many times as required immediately after the test, this being effected at the normal rate, at a slower rate, or with the sequence on specific frames.

It is another important teaching of this invention that the instructor 10 has available a set of transparent grids such as the grid 13 shown in dash lines on the drawing and each bearing a mark 14 representing the size of a target of given dimensions at a given range.

The instructor 10 selects the appropriate grid 13 and places it before the screen of display unit 9, in the position shown in dash lines in the drawing.

Once the transparent grid 13 is in position in front of the scope, the instructor 10 can evaluate the aiming errors of trainee operator 1 and make the camera reticle 15 coincide with the grid by operating on the image framing knobs 16 of scope 9.

It will be appreciated that by virtue of this particularity, it is possible for the instructor to use the scope:

either to check that the aiming point on the target has not exceeded the error margin corresponding to the target format on grid 13;
or to count the number of images in which the error exceeds the target format, thus giving an unusually simple way of assessing the trainee's progress; this makes it possible for the instructor to choose grids with progressively smaller target formats as the trainee improves.

It is to be noted in addition that the provision of a camera reticle and a transparent grid makes it possible to eliminate coincidence errors between the reticle/axis of optical instrument 2 and the image on the scope 9, said image being subject to displacements in relation to the viewing surface on the scope, as a function of the supply voltage.

It will be appreciated from the foregoing that:

1. during manipulations by the trainee operator 1 it will be possible for the instructor 10, after he has placed before the scope 9 the appropriate transparent grid 13 that helps him to observe aiming errors irrespective of the size of the actual target, to advise the trainee at all times either by a direct link or by telephone or radio link;
2. immediately after a test, the instructor 10 can redisplay what the trainee 1 saw:
   at normal speed,
   at reduced speed,
   or on still images;
3. the instructor is given the possibility of retaining the most interesting sequences:
   either in order to make a detailed image-by-image analysis of the aiming tests,
   or in order to compile records so as to show the achievable performances, or the mistakes to be avoided, to other trainees;
4. it is possible to retain the installation during real trials, for instance in cases where it is required to train operators in the semi-automatic guidance of missile systems.

This in turn makes it possible to carry out real firings and to compare their results with those obtained during training.

In other words, it will be manifest that a combination of the means described hereinbefore endows the subject method of this invention with the advantages which are set out hereinafter, which advantages clearly distinguish the invention from all other known systems currently in use:

a. One or more persons, whether instructors or trainees, can observe from a distance and under good conditions what the trainee operator or operators see and can note the smallest errors between the reticle and the aiming point on the target. This continuous supervision further enables the instructors to give the necessary recommendations while the trainee is manipulating his instrument.

b. Trainee operators can operate directly on the real equipment, under actual operating conditions.

c. The training can be done against a target of any size that has not been specially prepared beforehand, and possibly without its knowledge, for instance against a pedestrian, a car or a truck on a road.

d. Immediately after the aiming test, the instructor or instructors can redisplay, as many times as they wish, in the presence of one or more trainees, what the latter saw, and can analyse the difficulties encountered with them and advise them before they begin another test.

e. It is possible to store all or part of the results of the tests:

to assess the progress made by the trainee or trainees, to make an accurate image-by-image analysis of the aiming errors, or to give preliminary instruction to trainees by showing them what performances are possible or what mistakes should be avoided.

It goes without saying that changes and substitutions of parts may be made in the preferred non-limitative embodiment hereinbefore described, without departing from the scope of the invention as set forth in the appended claims.

We claim:

1. Apparatus for providing rapid training to trainee operators in accurately aiming the reticle of an optical aiming instrument at a target comprising a television camera fixed to the optical aiming instrument and having a reticle mounted with its optical axis in the line of sight and thus sighted identically with the reticle of the optical aiming instrument;

power supply and signal generating means connected to said camera;

means for displaying images of the target sighted and said camera reticle and for evaluating the accuracy of the aiming of the reticle of the optical aiming instrument at a target, at a location remote from said camera and having a screen for viewing the images;

a transparent grid removably mounted in front of said screen of said display means and bearing marks representing the dimensions of the target being aimed at by the trainee;

control means on said display means to make said marks on said grid coincide with said displayed camera reticle by framing the images in said grid;

video recorder means connected to said display means to store for display the images displayed on said display means screen at a later time and at a selected variable rate of frame speeds whereby the accuracy of the trainee's aiming can be viewed at the remote display location.

2. The apparatus of claim 1, further characterized by additional transparent grids having marks representing dimensions of different size targets for substitution before said screen of said display means.

3. The apparatus of claim 1, further characterized by voice communication link means from said display means to said camera whereby instructions can be transmitted to the trainee operators.

4. A method for providing rapid training to trainee operators in accurately aiming the reticle of an optical aiming instrument at a target comprising the steps of attaching a television camera on the optical aiming instrument with the camera reticle mounted with its optical axis in the line of sight and thus sighted identically with the reticle of the optical aiming instrument, with said camera having power supply and signal generating means connected thereto;

displaying images of the target sighted by said camera and the camera reticle together at a remote location, to an instructor;

choosing, out of a set of transparent grids each of which is marked to represent the dimensions of a given target at a given range, the one most appropriate to the particular target being sighted by the trainee operator;

positioning the selected grid in front of the projection screen of the remote display means in order to enable the instructor to evaluate the operator's aiming errors;

and at the same time framing the image on the display means in the grid and causing the grid to coincide optically with the camera reticle so as to estimate the divergence of the point at which the operator aimed from the target, by observing the reticle, grid, and the framing of the images;

and recording the images on the display means in a video recorder for later reproduction.

5. The method of claim 4, further comprising the step of redisplaying the images from the video recorder and counting the number of images in which the reticle passed over the frame mark format of the grid.

* * * * *